United States Patent [19]

Liu et al.

[11] Patent Number: 5,250,317

[45] Date of Patent: * Oct. 5, 1993

[54] PRODUCTS FROM TREATMENT OF BLACK TEA

[75] Inventors: Richard T. Liu, Worthington; John C. Proudley, Delaware, both of Ohio

[73] Assignee: Nestec S.A., Vevey, Switzerland

[*] Notice: The portion of the term of this patent subsequent to Jul. 14, 2009 has been disclaimed.

[21] Appl. No.: 906,707

[22] Filed: Jun. 30, 1992

Related U.S. Application Data

[63] Continuation of Ser. No. 838,523, Feb. 19, 1992, Pat. No. 5,130,154, which is a continuation of Ser. No. 597,069, Oct. 15, 1990, abandoned.

[51] Int. Cl.$^5$ .............................................. A23F 3/08
[52] U.S. Cl. ................................... 426/597; 426/263; 426/312
[58] Field of Search .................. 426/597, 263, 312

[56] References Cited

U.S. PATENT DOCUMENTS

| | | |
|---|---|---|
| 3,445,236 | 5/1969 | Gurkin . |
| 3,787,590 | 1/1974 | Borders et al. . |
| 4,051,264 | 9/1977 | Sanderson et al. . |
| 5,130,154 | 7/1992 | Liu et al. .......................... 426/597 X |

Primary Examiner—Joseph Golian
Attorney, Agent, or Firm—Vogt & O'Donnell

[57] ABSTRACT

Black tea leaves are oxidized to provide treated leaves from which aqueous tea extracts which have minimal turbidity, particularly when cooled, may be obtained. The oxidation reaction is performed on black tea leaves which contain moisture only in an amount such that the oxidation reaction occurs at localized sites on and within the tea leaf structure.

11 Claims, No Drawings 5,250,317

PRODUCTS FROM TREATMENT OF BLACK TEA

CROSS REFERENCE TO RELATED APPLICATION

This is a continuing application of application Ser. No. 07/838,523, filed on Feb. 19, 1992 now U.S. Pat. No. 5,130,754 which is a continuing application of application Ser. No. 07/597,069 filed Oct. 15, 1990, now abandoned.

BACKGROUND OF THE INVENTION

The present invention relates to treating black tea leaves for providing aqueous beverage extracts which have minimal turbidity in cold water.

Black tea for preparing hot and cold beverages historically has been obtained by subjecting freshly picked tea leaves to various processing steps which include a fermentation step which employs enzymes which are naturally present in the fresh tea leaves. Under appropriate conditions, the enzymes effect an oxidation reaction with various chemical compounds present in the tea which results in providing the organoleptic and aesthetic characteristics associated with aqueous beverage extracts obtained from black tea. In addition, the art discloses processes for treatment of green tea to obtain a treated tea said to have characteristics of black tea by subjecting green tea to oxidation processes, such as disclosed, for example, in U.S. Pat. Nos. 2,975,057, 3,445,236 and 3,484,246.

Aqueous extracts obtained from black tea contain substances, believed to be primarily polyphenolic compounds and complexes of polyphenolic compounds and caffeine, as discussed in the art, responsible for the desirable organoleptic and aesthetic characteristics of the extracts. Although these substances are readily soluble in hot water, i.e., boiling water, at beverage concentrations and at temperatures when the beverage is consumed hot, i.e., above about 60° C., when the extracts are cooled to room temperature and below, these substances are, at most, only partially soluble in the water of the extract. Thus, the cooled extracts have a "cloudiness" which occurs from these substances being in a form of solids in suspension and from precipitated sediment. The cloudiness, which is not aesthetically acceptable, is known conventionally in the art as "turbidity", and the solids also are described as "tea cream".

Various methods and means have been proposed, attempted and utilized in the art to provide extracts which have minimal turbidity in cold water, the most simple being cooling a hot water extract of black tea so that a precipitate will form. The solids then are removed from the extract by means such as filtration or centrifugation. However, it long has been recognized that such processes are unacceptable because removal of the solids from the extract not only eliminates valuable organoleptic and aesthetic components, but also results in valuable yield losses.

Thus, various methods have been proposed, attempted and utilized to solubilize the substances which create the turbidity problem. Such efforts include, after aqueous extraction of black tea leaves, oxidizing the extract obtained, particularly under alkaline conditions, in the presence of oxygen, such as in U.S. Pat. No. 3,163,539. As also disclosed in that patent, a tea cream precipitate may be separated from the extract and oxidized. Then the resultant oxidized, solubilized material is added back to the extract.

Further methods to treat separated tea cream under alkaline conditions also are referred to and disclosed in U.S. Pat. Nos. 3,151,985 and 3,451,823 and in Canadian Patent No. 927,189, the latter of which also discloses treating the oxidized cream with sulfur-containing compounds to obtain improved color characteristics. On the other hand, U.S. Pat. No. 3,787,590 discloses performing oxidation of tea cream in the absence of added alkali in a manner so the oxidation will take place at a pH in the range of from about 2 to about 3.5.

Other efforts in the art to reduce turbidity and improve clarity of black tea extracts include, as disclosed in U.S. Pat. No. 3,787,582, adding a pectinage enzyme preparation to aqueous black tea extracts which is said also to reduce foaming of instant water-soluble extracts prepared therefrom and also to improve color; treating the extracts with catechins, as disclosed in U.S. Pat. No. 4,680,193; adding a water-soluble caseinate to the extracts, as disclosed in European Patent Application Publication No. 0 133 772; and adding tannase or tannase producing molds to the extracts, as disclosed in British Patent Specification 1 249 932 and in U.S. Pat. No. 3,959,497, respectively.

Additionally, U.S. Pat. No. 4,051,264 discloses a process for treating green tea with tannase which is said to, after a traditional fermentation process, yield treated leaves which provide an extract having a reduced level of cold water insoluble solids as compared with an extract obtained from leaves not so treated.

It also has been disclosed that black tea leaf may be treated to prepare a product having greater solubility than conventional black tea extracts by treating the leaf with an enzyme solution containing tannase and at least one "cell wall digesting" enzyme, such as cellulase, pectinase, papain or hemicellulase, as disclosed in U.S. Pat. No. 4,639,375.

Finally, Nagalakshmi, et al., Food Chemistry 13 (1984) 69-77, disclose that the amount of tea cream solids in extracts of black tea may be reduced by incorporating various carbohydrates into green tea leaves and then fermenting the treated green tea to obtain black tea.

SUMMARY OF THE INVENTION

The present invention is characterized in that polyphenolic compounds contained in moist black tea leaves are heated and oxidized at a pressure greater than the water vapor pressure at the reaction temperature.

The black tea leaves treated in accordance with this invention are, as black tea is conventionally known in the art, black fermented leaves, i.e., leaves which have been produced and obtained by enzymatic oxidation by fermentation.

With more particularity, the present invention is characterized in that moist black tea leaves are contacted at elevated temperature at a pressure greater than a water vapor pressure at the elevated temperature with an oxidizing agent which provides an amount of molecular oxygen sufficient to oxidize polyphenolic compounds contained in the moist leaves.

After carrying out the process of the present invention, the treated leaves may be processed immediately to prepare a water-soluble instant tea product, or they may be dried for subsequent extraction for preparation of a beverage.

The present invention also includes oxidized black tea leaves which provide aqueous extracts having a turbidity of less than that of extracts obtained from like black tea leaves subject only to environmental processes of oxidation, i.e., subject only to atmospheric and other natural oxidation phenomena. Preferably, the oxidized black tea is one which provides aqueous extracts having a turbidity of less than 200 Nephalometric Turbidity Units ("NTU"), a characterization familiar to one of ordinary skill which may be determined as described hereinafter in the Examples. Most preferably, the oxidized black tea is one which provides extracts having a turbidity of less than 100 NTU, as determined and defined in the Examples.

To obtain the desired results from the process of the present invention, the amount of moisture contained in the leaves during treatment is a very critical variable. It is essential that the leaves only be moist which is believed to facilitate the permeation of the leaves by the oxidizing agent.

For purposes of this disclosure and claims, the term "moist" is intended to mean and used to mean that there be no free water present between or amongst the leaves during the oxidation step which would occur upon the leaves becoming saturated with water. Therefore, it is essential that the upper limit of the amount of water added is such that saturation of the leaves with water and the presence of free water, which would tend to result in formation of an aqueous phase or which would tend to cause extraction of the leaves or result in a slurry, are substantially avoided. The presence of such free water will result in a severe pH decrease during the oxidation reaction which will inhibit and slow, if not result in arresting, the oxidation reaction. Such also will affect the flavor and color of the final product adversely.

Thus, in the process of the present invention, by reason of the leaves being only moist and thereby having no free water present, the oxidation reaction takes place in localized sites on and within the tea leaf structure. It has been discovered that this results in promoting the oxidation reaction because the pH changes which occur due to the oxidation reaction occur substantially only at the localized sites and do not substantially affect neighboring oxidation reaction sites which would occur if free water were present. Thus, the present invention affords a method to control the pH of the oxidation reaction and avoids the need for employing alkaline compounds in the reaction to control pH or the need for significant, if any, pH adjustment of extracts obtained.

To obtain an extract having a turbidity of about 200 NTU and below, it is essential that the black tea leaves to be oxidized have a moisture content of at least about 13% by weight based upon the weight of dry tea solids ("by weight dry tea solids"). To obtain an extract having a turbidity of about 100 NTU and below, which provides a cold water soluble extract at conventional beverage strength, i.e., about 0.3% tea solids by weight, having little, if any, noticeable turbidity, it is essential that the moisture content of the moist black tea leaves to be oxidized be at least about 19% by weight dry tea solids.

In carrying out the process of the present invention, the moist tea leaves, and hence the various oxidizable substances of the tea leaves, are contacted with molecular oxygen. Although various oxidizing agents can be employed to provide the molecular oxygen for the reaction, various chemical agents such as hydrogen peroxide or permanganate, for example, may be deemed undesirable because residues of the same in the treated leaves may be considered to be food additives, and thus, the final product therefore would not be considered to be 100% tea. Thus, gaseous oxidizing agents are most preferred. Suitable gaseous oxidizing agents include ozone or ozone-containing gases, but more advantageously, an oxygen-containing gas, including air and oxygen-enriched air, may be employed. For most efficient results, however, oxygen gas is employed as the oxidizing agent.

In addition, when carrying out the present invention with gaseous oxidizing agents, it has been discovered that for optimal results, that is, for obtaining an extract having a turbidity of less than 100 NTU and having good flavor and color characteristics, the amount of molecular oxygen employed is critical in relation to the amount of the tea solids being treated. If too little molecular oxygen is present, optimal reduction of turbidity will not be realized. If too much oxygen is employed, the organoleptic and color properties of the extracts obtained from treated leaves are affected adversely. Hence, for results of obtaining a tea extract having a turbidity of 100 NTU and below, molecular oxygen is contacted with the moist tea leaves in an amount of from at least about 0.3 moles $O_2$/kg of tea based upon the dry weight of the tea solids contained in the moist leaves ("$O_2$/kg dry tea solids") up to an amount of about 2.5 moles $O_2$/kg dry tea solids.

In carrying out the oxidation reaction, elevated temperatures sufficient for obtaining the desired results are on the order of from about 100° C. to about 130° C., the reaction being difficult to control at temperatures above 130° C. The amount of time sufficient for carrying out the reaction is on the order of from about 3 mins to 30 mins and is inversely proportional to the temperature and the amount of molecular oxygen employed. Thus, generally, at higher temperatures and with higher amounts of molecular oxygen, shorter times are employed. On the other hand, at lower temperatures and with lesser amounts of molecular oxygen, longer times are employed. As noted above, pressures at least greater than the water vapor pressure at the oxidizing reaction temperature of the moist tea are employed which thereby enables maintaining the reaction temperature.

DESCRIPTION OF PREFERRED EMBODIMENTS

When the black tea leaves to be treated in accordance with the present invention are in a dry state having a stable moisture content, which conventionally is in a range of from about 5% to about 7% by weight dry tea solids, the leaves first are moistened with water, conveniently in the vessel in which the oxidation step is to be performed. Dependent, of course, upon the inherent characteristics of the black tea, moisture contents on the order of greater than about 70% by weight dry tea solids should be avoided since such amounts, generally, can result in saturation of the leaves and formation of free water, if not an identifiable aqueous phase.

It has been discovered that optimal results, i.e., oxidized black tea which provides extracts having a combination of little, if any, turbidity and optimal flavor and color, and greatest efficiency are realized when the leaves treated have a moisture content of from about 19% to about 25% by weight dry tea solids. In this regard, it has been found that although the desired turbidity reduction is achieved when employing moisture contents greater than about 25%, such confers no particular decreased turbidity benefit. It also has been observed that leaves moistened to a moisture content of greater than about 25%, generally provide extracts which tend to have a more grayish hue than those obtained from teas treated having moisture contents of from about 19% to about 25%. Additionally, organoleptic evaluations of the extracts indicate that leaves treated having moisture contents greater than about 25% are generally less preferred than extracts prepared from leaves treated having a moisture content of from about 19% to about 25%. Additionally, it further has been found that when employing higher moisture contents, the pH of extracts obtained from the treated teas tends to become more acidic. Of course, if the oxidized tea is to be dried, longer drying times will be required at higher moisture contents.

An object of the moistening step is to moisten the leaves uniformly, and to that end, preferably, the leaves are moistened by spraying them with water by means such as with a series of nozzles contained in the vessel. Preferably, the leaves being moistened are agitated, such as with a stirrer, by tumbling, or by a fluidized bed, or other such agitating means. Should a continuous system be employed which has separate zones for performing the various treating steps separated by such as surge means, a screw device may be employed for moving the leaves to be treated in and through the treating zones and for thereby agitating the leaves in the treating zones. In such a system, it would be preferred that the moist leaves and molecular oxygen be contacted in a countercurrent flow.

For best results, after adding the water to the leaves, the moisture is allowed to equilibrate throughout the leaves, preferably while agitating the leaves, so that the moisture is substantially uniformly imbibed by and distributed in the leaves and so that there is no free water between and amongst the moist leaves to be treated in the oxidizing step.

To avoid loss of aromatic compounds from the leaves or unnecessary oxidation of aromatic compounds during the oxidizing step, it is advisable to perform an aromatics removal step prior to the oxidizing step by any of the many aromatics removal techniques known in the art. Preferably, the aromatics removal step is performed with saturated steam after the moistening step which again, if the vessel is appropriately adapted, may be carried out in the vessel in which the oxidizing stop is to be performed.

In carrying out preferred embodiments of the present invention, specified amounts of molecular oxygen are supplied, most preferably in the form of substantially pure oxygen gas as hereinafter exemplified, to the moist leaves for obtaining particular ratios of molecular oxygen in relation to dry tea solids, expressed herein as moles $O_2$/kg dry tea solids. Thus, a known quantity of oxygen gas is contacted with moist leaves having a known amount of dry tea solids. In cases when other sources of molecular oxygen, e.g., ozone, air, or oxygen-enriched air are employed, the available molecular oxygen may be calculated to determine the quantity of the gas required to practice the process of the present invention. As is evident, lesser quantities of molecular oxygen in the gas will require greater absolute amounts of gas.

Prior to contacting the leaves with the desired amount of molecular oxygen, for best control of the process, the moist leaves are preheated in the reaction vessel to the reaction temperature which is desired to be employed in the oxidizing step. To effect the heating of the moist leaves, the vessel may be jacketed for providing the heat and should contain a probe for measuring the temperature of the moist leaves. To obtain uniform heating, preferably, the moist leaves are agitated by means such as noted above.

Likewise, preferably, for enabling best control of the process, the temperature of the oxygen is increased to the desired reaction temperature prior to its introduction into the reaction vessel. In addition, for best process control, moisture is introduced into the oxygen while it is being heated so that the oxygen will be substantially saturated with moisture at the reaction temperature and pressure. To effect heating and moistening of the oxygen, most conveniently, the oxygen may be sparged through heated water, for example.

The oxidizing step may be carried out in the reaction vessel in either an open or closed mode, i.e., a system open or closed to the atmosphere. In either system, to obtain the objective of obtaining substantially uniform contact of the oxygen with the heated moist leaves most effectively, again preferably, the heated moist leaves are agitated in the oxidizing step by means as noted above.

When the oxidizing step is carried out in a closed system, preferably, the entire quantity of the preheated moistened oxygen gas required for obtaining the desired is ratio of molecular oxygen to dry tea solids is introduced into the vessel containing the preheated moistened tea. In the closed system, the pressure is dependent, primarily, upon the amount of oxidizing gas employed with respect to the range of temperatures employed and the void volume of the vessel.

In an open system, the reaction vessel has a vent to the atmosphere, and the desired amount of preheated moistened oxygen gas is fed at a fixed rate with respect to the desired time of treatment so that the desired amount of molecular oxygen contacts the heated moistened tea during the time of treatment. The vessel is vented at a fixed rate so that a pressure is maintained in the vessel at least slightly above the water vapor pressure at the elevated temperature, preferably a pressure of from about 1.0 kg/cm$^2$ to about 2.0 kg/cm$^2$ above the elevated temperature water vapor pressure. This enables maintenance of the reaction temperature.

It has been found that somewhat lesser amounts of molecular oxygen may be employed in a closed system than in an open system. That is, in the closed system, the entire quantity of oxygen gas required to obtain the desired molecular oxygen to tea solids ratio may be introduced at once, and therefore, the initial concentration of the available molecular oxygen is higher than is in the case when the entire quantity of oxygen gas is not introduced for contact with the tea leaves all at once.

To achieve the objects of the present invention in a closed system, the oxygen gas is supplied and introduced into the vessel to contact the tea to be treated to provide an amount of from about 0.3 moles $O_2$/kg dry tea solids to about 1.5 moles $O_2$/kg dry tea solids and preferably an amount of from about 0.9 $O_2$/kg moles dry tea solids to about 1.2 moles $O_2$/kg of dry tea solids.

Preferably, the temperatures employed in a closed system range from about 110° C. to about 125° C., with temperatures on the order of about 115° C. to about 120° C. being most preferred.

As is the case with all embodiments of the present invention, at lower reaction temperatures, the reaction does not proceed as efficiently and may require longer times on the order of approaching up to about 30 mins to achieve an optimal reduction of turbidity. On the other hand, at higher temperatures, shorter times, which may be on the order of about 3 mins to about 6 mins, should be utilized to avoid obtaining an extract having burnt flavor and aroma characteristics and having a light color containing grayish hues in comparison with the color of extracts obtained from conventional black tea.

In the closed system, in reactions in which preferred amounts of molecular oxygen and preferred temperatures are employed, reaction times on the order of about 5 mins to about 25 mins are preferred, and times on the order of from about 12 mins to about 20 mins are most preferred.

As mentioned above, in the open system, the oxygen gas is not generally as concentrated during the reaction, particularly initially, as may be provided in the closed system. Thus, the lowest amount of molecular oxygen which should be employed to realize optimal benefits of the present invention is somewhat higher than that which is employed in the closed system, and likewise, the upper extent of the range which may be employed may be somewhat higher. Hence, in the open system, oxygen gas is introduced into the reaction vessel to contact the tea to be treated to provide, over the desired period of the reaction time, molecular oxygen to contact the heated moist tea in an amount of from about 1.4 moles $O_2$/kg dry tea solids to about 2.5 moles $O_2$/kg dry tea solids. Preferably, the oxygen gas is supplied in an amount sufficient to contact the tea over the period of the desired reaction time with molecular oxygen in an amount of from about 1.6 moles $O_2$/kg dry tea solids to about 2.3 moles $O_2$/kg dry tea solids.

As with the closed system, in the open system, temperatures on the order of from 100° C. to 130° C. and times on the order of from about 5 mins to about 30 mins may be employed, but it has been found that the reaction is not as sensitive to conditions of temperature and time in the open system as in the closed system. Thus, employing an open system allows obtaining the desired results by treating the heated moist leaves over a range of preferred temperatures and times on the order of from about 110° C. to about 125° C. for about 15 mins to about 20 mins. Moreover, it has been discovered that, generally, a better quality final product is obtained in the open system, which is believed to be attributable to removal of oxidation by-products including, particularly, carbon dioxide, by reason of the flow-through venting of the procedure.

After the desired period of treatment, preferably, the treated tea is cooled, preferably rapidly, such as by means of introducing a cooling fluid in jacket of the treatment vessel while, preferably, continuing to agitate the treated tea. After cooling, the pressure in the vessel is released.

Most efficiently, particularly for preparing tea products which will be extracted directly by the consumer, the treated tea may be transferred immediately to a dryer, which preferably is a fluidized bed dryer, to dry it to a stable moisture content.

For preparation of instant water-soluble tea, advantageously, the treated tea is transferred directly to an extraction vessel and processed in any of the various ways well-known to those skilled in the art for making soluble instant tea.

Thus, the present invention provides a process for obtaining, particularly under brew extraction conditions, i.e., addition of water at a temperature of about 100° C., a chemical- and additive-free tea which is readily extractable in water and which, at room temperature and below, provides extracts which do not have significantly noticeable turbidity. Hence, the present invention provides, in particular, oxidized black tea leaves which the consumer may extract to prepare a brew which remains crystal clear upon chilling, the same being true for instant products prepared from oxidized leaves extracted under similar brew extraction conditions. Under extraction conditions more extreme than brew extraction conditions, the extracts prepared will have significantly less turbidity than extracts obtained from like tea not treated in accordance with the process of this invention without the necessity of employing chemicals or additives heretofore employed to achieve that result, while maintaining valuable organoleptic and aesthetic components in the extracts.

EXAMPLES

The following examples are illustrative of the present invention and parts and percentages are by dry weight unless otherwise indicated.

DESCRIPTION OF TURBIDITY TEST

Testing for turbidity and clarity are performed as follows:

I. 200 ml deionized water having a temperature of about 100° C. is added to 25 g of tea leaves which then are steeped for 2½ mins. The infusion then is mildly agitated for 10 secs and then allowed to stand for 2 mins, 20 secs. The extract is separated from the leaves through a 270 U.S. standard mesh NYTEX screen. The solids concentration of the extract is adjusted with deionized water to 2.0% solids by weight, and the solids adjusted extract then is cooled to room temperature.

II. Turbidity of a portion of the room temperature extract then is measured with a RACH ratio turbidmeter, model 18900, at room temperature.

III. Another portion of the 2% extract is stored for at least 48 hrs at 40° C. to check for precipitation.

Based on the foregoing tests, it has been found that extracts having a 2% solids concentration by weight and having a turbidity of less than 100 NTU at room temperature remain clear in storage at 4° C. for 48 hrs without formation of a precipitate.

EXAMPLE I

About 0.35 kg of a blend of 50% by weight Sumatra and 50% by weight African Esperanza black teas, which are black fermented teas, are moistened in a vessel to a moisture content of about 20% by weight dry tea solids by spraying them with water while agitating them. After adding the water, agitation is continued for enabling the moisture to equilibrate throughout the leaves.

A jacketed pressure vessel having a void volume of about 2.8 l is preheated to a temperature of about 90° C. and then the moist leaves are placed in the vessel. The vessel then is closed to the atmosphere and heated to about 115° C. to heat the moist leaves to about 115° C., as determined by a temperature probe in the vessel, while agitating the leaves by stirring with horizontally positioned paddles extending through the vessel.

While heating the moist leaves in the vessel, oxygen is introduced into a second vessel which has a void volume of about 2.0 l to purge the vessel of atmospheric air so that the vessel will contain substantially only oxygen and be under a pressure which is about 9.5 kg/cm² greater than the pressure in the jacketed vessel containing the heated moist leaves.

Upon the heated moist leaves attaining a temperature of about 115° C., the oxygen in the second vessel is directed from that vessel through a water bath heated to about 115° C. for heating and moistening the oxygen. The heated moist oxygen then is introduced into the first vessel such that about 0.7 moles $O_2$/kg dry tea solids are present in the reaction vessel, and then the reaction vessel is closed off to the oxygen. The temperature of the heated moist leaves is maintained at about 115° C. for about 17.5 mins while agitating the leaves, after which time the temperature is reduced to about 90° C. by introducing cold water in the jacket while still agitating the treated leaves. The pressure of the vessel then is released, and the treated tea is removed from the vessel and then dried.

The infusion obtained for preparing the 2% by weight extract has a reddish brown color and a pH of 3.9. Upon performing a turbidity test as described above, it is found that the 2% extract has a turbidity of 50 NTU. After letting a portion of the 2% extract stand for 48 hrs at 4° C., no sedimentation is apparent.

COMPARATIVE EXAMPLE I

A turbidity test is performed upon an extract of the same tea blend as that employed in Example I except that the tea is not treated in accordance with the present invention. The extract has a pH of 4.5. The turbidity of a 2% extract is 630 NTU.

EXAMPLE II

Water is added to about 0.35 kg of a blend by weight of 60% Indonesian, 20% Kenyan and 20% Sri Lanka black tea leaves, which are black fermented teas, to moisten the leaves to a moisture content of about 20% by weight dry tea solids as in Example I.

A jacketed pressure vessel having a void volume of about 2.8 l is preheated to about 90° C., and then the moist leaves are placed in the vessel. The vessel then is closed to the atmosphere and heated to heat the moist leaves to about 120° C., as indicated by a temperature probe in the vessel. While the moist leaves are being heated to the 120° C. reaction temperature, oxygen is introduced into a second vessel having a volume of about 2.8 l in an amount to obtain a pressure of about 9 kg/cm² greater than the pressure in the jacketed vessel containing the heated moist leaves.

When the heated moist leaves attain a temperature of about 120° C., the oxygen from the second vessel is directed through a water bath heated to about 120° C. into the bottom of the reaction vessel. A venting device on the reaction vessel is opened to the atmosphere to reduce and maintain the pressure in the jacketed reaction vessel to and at about 1.1 kg/cm². The flow of oxygen is controlled at about 825 cc/min, at standard temperature and pressure conditions, using an in-line flow meter for about 15 mins, which provides molecular oxygen in an amount of about 1.6 moles $O_2$/kg dry tea solids, after which the gas supply is sealed off from the reaction vessel, and the vent valve is closed. The reaction vessel is cooled by introducing cold water into the jacket, and then the pressure in the vessel is released. The treated leaves are removed from the vessel and dried.

The infusion brew extract obtained for preparing the 2% extract for the turbidity test has a pH of 4.8. The turbidity test, as outlined above, is performed. The 2% extract has a turbidity of 40 NTU. After storing the 2% extract at 4° C. for 48 hrs, no turbidity or precipitate forms in the extract.

COMPARATIVE EXAMPLE II

A turbidity test is performed on an extract obtained from the same tea blend as that employed in Example II except that the tea is not treated in accordance with the present invention. The extract has a pH of 5.0. A 2% extract has a turbidity of 400 NTU, and a precipitate is evident after storing a portion of the 2% extract for 48 hrs at 4° C.

EXAMPLE III

About 0.35 kg of a blend by weight of 60% Indonesian, 20% Kenyan, and 20% Sri Lanka black teas, which are black fermented teas, having a moisture content of about 6.1% by weight dry tea solids are employed in each of several trials in a closed system mode. The reaction temperature of each trial is about 115° C., and each reaction is carried out for about 15 mins. The amount of oxygen employed in each trial is about 0.65 moles $O_2$/kg dry tea solids. The moisture content of the leaves is the variable manipulated.

The turbidity of extract brews of the treated samples is determined as above and is compared with an extract obtained from an untreated sample of the blend which has a turbidity of 630 NTU and a pH of 5.01.

| Moisture Content By Weight Dry Tea Solids | NTU | pH |
|---|---|---|
| 7.1 | 590 | 4.98 |
| 10.6 | 500 | 4.95 |
| 11.1 | 420 | 4.79 |
| 11.7 | 250 | 4.77 |
| 13.2 | 180 | 4.75 |
| 14.7 | 148 | 4.64 |
| 16.5 | 136 | 4.72 |
| 16.8 | 139 | 4.74 |
| 17.2 | 126 | 4.72 |
| 18.8 | 114 | 4.77 |
| 19.9 | 60 | 4.66 |
| 21.8 | 46 | 4.65 |
| 23.2 | 62 | 4.70 |
| 23.7 | 61 | 4.70 |
| 24.9 | 52 | 4.70 |
| 25.4 | 68 | 4.70 |
| 32.0 | 56 | 4.75 |
| 41.1 | 47 | 4.69 |
| 67.6 | 63 | 4.60 |

From the foregoing, it is clear that a moisture content of at least about 19% by weight dry tea solids must be employed to obtain a turbidity approaching and below 100 NTU. It also can be seen that no substantially significant further benefit, with regard to turbidity, is obtained with increasing amounts of moisture above about 25% by weight dry tea solids.

EXAMPLE IV

The relationship of temperature and time is demonstrated by the following table reflecting trials of treating samples of a blend by weight of 50% Sumatra and 50% African Esperanza black teas, which are black fermented teas, moisturized to about 20% by weight dry tea solids with about 1.0 moles $O_2$/kg dry tea solids in a closed system.

A control extract obtained from the untreated leaves has a pH of 4.5, and the turbidity of a 2% control extract is 630 NTU.

| Time (mins) | Temp. (°C.) | NTU | pH |
| --- | --- | --- | --- |
| 5 | 110 | 230 | 4.1 |
| 5 | 120 | 56 | 3.9 |
| 5 | 130 | 22 | 3.7 |
| 15 | 110 | 120 | 4.2 |
| 30 | 110 | 39 | 3.9 |
| 15 | 130 | 32 | 3.6 |
| 30 | 120 | 21 | 3.6 |

The results thus show the inverse relationship of temperature and time and also that the combination of temperature and time has an effect upon the pH of extracts obtained from the oxidized leaves.

EXAMPLE V

The following table shows results of trials in which reaction temperature and time in an open system are varied. The same blend of black teas is employed as in Example III. The moist tea leaves treated have a moisture content of about 20% by weight dry tea solids and are contacted with about 1.6 moles $O_2$/kg dry tea solids.

| Time (mins) | Temp. (°C.) | NTU | pH |
| --- | --- | --- | --- |
| 10 | 115 | 176 | 4.91 |
| 10 | 120 | 91 | 4.87 |
| 15 | 120 | 30 | 4.86 |

The results show that a combination of higher temperatures and longer times may be employed in the open system than in the closed system.

EXAMPLE VI

The following table shows examples of the effect of varying the amount of oxygen, temperature and time in a closed system wherein trials are run with samples of the same blend of black teas as in Example IV. The moist tea leaves have a moisture content of about 20% by weight dry tea solids.

| Time (mins) | Temp. (°C.) | Moles $O_2$/kg dry tea solids | NTU | pH |
| --- | --- | --- | --- | --- |
| 5 | 110 | 0.4 | 455 | 4.2 |
| 5 | 110 | 1.0 | 230 | 4.1 |
| 10 | 110 | 0.5 | 360 | 4.1 |
| 15 | 110 | 0.6 | 220 | 4.1 |
| 15 | 110 | 1.0 | 120 | 4.2 |
| 30 | 110 | 0.5 | 53 | 4.0 |
| 30 | 110 | 1.0 | 39 | 3.9 |
| 17.5 | 115 | 0.7 | 50 | 3.9 |
| 5 | 120 | 0.4 | 105 | 4.1 |
| 5 | 120 | 1.0 | 56 | 3.9 |
| 30 | 120 | 0.4 | 59 | 4.0 |
| 30 | 120 | 1.0 | 21 | 3.6 |
| 5 | 130 | 0.9 | 22 | 3.8 |
| 15 | 130 | 0.5 | 27 | 3.9 |
| 15 | 130 | 0.9 | 32 | 3.6 |

As may be seen from the above, as reaction time and/or temperature is increased, lesser amounts of oxygen are required, and on the other hand, higher concentrations of oxygen likewise can provide the ability to employ lower temperatures and times.

EXAMPLE VII

The following shows examples of the effect of varying the amount of oxygen and temperature and time in an open system wherein trials are run with samples of the same blend of black teas as in Example III. The moist tea leaves have a moisture content of about 20% by weight dry tea solids.

| Time (mins) | Temp. (°C.) | Moles $O_2$/kg dry tea solids | NTU | pH |
| --- | --- | --- | --- | --- |
| 15 | 110 | 2.2 | 270 | 4.90 |
| 30 | 110 | 1.4 | 96 | 4.89 |
| 10 | 115 | 1.6 | 176 | 4.91 |
| 10 | 115 | 2.3 | 170 | 4.89 |
| 15 | 115 | 1.1 | 110 | 4.91 |
| 15 | 115 | 2.3 | 44 | 4.86 |
| 5 | 120 | 0.7 | 230 | 4.94 |
| 5 | 120 | 1.4 | 160 | 4.94 |
| 10 | 120 | 1.6 | 91 | 4.87 |
| 15 | 120 | 1.6 | 30 | 4.86 |

In addition to showing the effect of the amount of oxygen and its interrelation with temperature and time, this also shows that the open system has a lesser effect upon the pH of an extract obtained from the product than is the case in the closed system.

As is clear from the foregoing, various modifications of the present invention may be without departure from the spirit and scope of the disclosure, and the invention may be practiced suitably in the absence of elements not specifically disclosed herein.

We claim:

1. A black tea product of a process comprising contacting moist black fermented tea leaves at an elevated temperature at a pressure greater than the water vapor pressure at the elevated temperature with an oxidizing agent which provides an amount of molecular oxygen sufficient to oxidize polyphenolic compounds contained in the moist leaves for obtaining a black tea leaf product which provides, upon aqueous extraction, an extract having a turbidity of less than 200 NTU at room temperature, wherein the turbidity is determined by infusing the product leaves with water having a temperature of about 100° separating infusion extract from the product leaves through a 270 U.S. standard mesh NYTEX screen and adjusting the extract with deionized water to obtain a 2% solids concentration by weight and then measuring the turbidity of the 2% solids extract.

2. A product of the process according to claim 1 wherein the leaves to be contacted have a moisture content of from about 19% to about 25% by weight dry tea solids.

3. A product of the process according to claim 1 wherein the oxidizing agent is selected from a group of gases consisting of oxygen gas, oxygen-containing gases, air, air enriched with oxygen, ozone and ozone-containing gases.

4. A product of the process according to claim 1 or 2 or 3 wherein the moist leaves are contacted with the oxidizing agent in an amount of from about 0.3 moles $O_2$/kg dry tea solids to about 2.5 moles $O_2$/kg dry tea solids.

5. A product of the process according to claim 4 wherein the elevated temperature is from about 100° C. to about 130° C. and wherein the leaves are contacted with the oxidizing agent for a time of from about 3 mins to about 30 mins.

6. A product of the process according to claim 1 or 2 or 3 wherein the process is carried out in a system closed to the atmosphere, wherein the oxidizing agent is oxygen gas, wherein the moist leaves are contacted with the oxygen gas in an amount for providing from about 0.9 moles $O_2$/kg dry tea solids to about 1.2 moles $O_2$/kg dry tea solids and wherein the moist leaves are contacted with the oxygen gas at a temperature of from about 110° C. to about 125° C. for a time of from about 5 mins to about 25 mins.

7. A product of the process according to claim 1 or 2 or 3 wherein the process is carried out in a system open to the atmosphere, wherein the oxidizing agent is oxygen gas, wherein the moist leaves are contacted with oxygen gas in an amount for providing from about 1.6 moles $O_2$/kg dry tea solids to about 2.3 moles $O_2$/kg dry tea solids and wherein the moist leaves are contacted with the oxygen gas at a temperature of from about 110° C. to about 125° C. for a time of from about 15 mins to about 20 mins.

8. Oxidized black fermented tea leaves which provide an aqueous extract having a turbidity of less than 200 NTU at room temperature, wherein the turbidity is determined by infusing the leaves with water having a temperature of about 100° C. separating infusion extract from the leaves through a 270 U.S. standard mesh NYTEX screen and adjusting the extract with deionized water to obtain a 2% solids concentration and then measuring the turbidity of the 2% solids extract.

9. Oxidized black fermented tea leaves according to claim 8 which provide an aqueous extract having a turbidity of less than 100 NTU at room temperature.

10. A black tea product of a process comprising contacting black fermented tea leaves having a moisture content of from about 13% to about 25% by weight dry tea solids with an oxidizing agent to provide oxygen in an amount of from about 0.3 moles $O_2$/kg dry tea solids to about 2.5 moles $O_2$/kg dry tea solids at a temperature of from about 100° C. to about 130° C. for about 3 mins to about 30 mins to oxidize polyphenolic compounds contained in the leaves.

11. A product of the process of claim 10 wherein the leaves contacted with the oxidizing agent have a moisture content of from about 19% to about 25% by weight.

* * * * *

UNITED STATES PATENT AND TRADEMARK OFFICE
CERTIFICATE OF CORRECTION

PATENT NO. : 5,250,317
DATED : October 5, 1993
INVENTOR(S) : Richard Tien-Szu LIU, et al.

It is certified that error appears in the above-identified patent and that said Letters Patent is hereby corrected as shown below:

Column 1, line 9, "5,130,754" should be --5,130,154--.

Column 12, line 45 [line 12 of claim 1], after "100°", insert --C.,--.

Column 14, line 2 [line 5 of claim 8], insert a comma after "C.".

Signed and Sealed this

Fifth Day of April, 1994

Attest:

BRUCE LEHMAN

Attesting Officer     Commissioner of Patents and Trademarks